(12) United States Patent
Harris et al.

(10) Patent No.: US 10,663,577 B1
(45) Date of Patent: May 26, 2020

(54) ELECTRO OPTICAL AND RADIO FREQUENCY FUSION FOR THREAT DETECTION

(71) Applicant: BAE Systems Information and Electronic Systems Integration Inc., Nashua, NH (US)

(72) Inventors: Brian A Harris, Bedford, NH (US); Timothy J O'Donnell, Bedford, NH (US); Michael R Sweeney, Windham, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 327 days.

(21) Appl. No.: 15/827,849

(22) Filed: Nov. 30, 2017

(51) Int. Cl.
*G01S 13/86* (2006.01)
*G01S 13/78* (2006.01)
*G01S 13/87* (2006.01)
*G01S 13/06* (2006.01)
*G01S 13/04* (2006.01)
*F41H 11/02* (2006.01)
*G01S 13/00* (2006.01)

(52) U.S. Cl.
CPC .............. *G01S 13/86* (2013.01); *G01S 13/04* (2013.01); *G01S 13/06* (2013.01); *G01S 13/78* (2013.01); *G01S 13/874* (2013.01); *F41H 11/02* (2013.01)

(58) Field of Classification Search
CPC ........ G01S 13/86; G01S 13/78; G01S 13/874; G01S 13/06; G01S 13/04; G01S 7/38; G01S 7/36; G01S 7/021; F41H 11/02
See application file for complete search history.

(56) References Cited

U.S. PATENT DOCUMENTS

| 4,797,313 A | 1/1989 | Stolk et al. | |
|---|---|---|---|
| 5,287,110 A * | 2/1994 | Tran | G01S 7/38 342/13 |
| 5,406,286 A * | 4/1995 | Tran | G01S 7/021 342/13 |
| 5,457,460 A * | 10/1995 | Tran | G01S 7/36 342/13 |

(Continued)

FOREIGN PATENT DOCUMENTS

WO 2016187112 A1 11/2016

OTHER PUBLICATIONS

PCT Search Report for PCT Application No. PCT/US2017/040714, dated Aug. 30, 2017, 8 pages.

*Primary Examiner* — Bernarr E Gregory
(74) *Attorney, Agent, or Firm* — Maine Cernota & Rardin

(57) ABSTRACT

A data fusion system for combining and parsing data from multiple EO and RF threat warning systems, the system including a plurality of input systems capable of providing feature-level data about an environment in which they are operating. Each input system may be configured to output information regarding its capabilities and the environment in which it is operating. A fusion block is placed in operative communication with the plurality of input systems and battlespace information and configured to algorithmically combine the data and determine the presence or absence of a threat. An output may be placed in operative communication with the fusion block, thereby allowing the fusion block to provide information and/or notifications to the relevant parties and/or systems.

20 Claims, 4 Drawing Sheets

(56) References Cited

U.S. PATENT DOCUMENTS

| | | | | |
|---|---|---|---|---|
| 5,508,928 | A * | 4/1996 | Tran | G01S 7/36 |
| | | | | 342/13 |
| 5,574,458 | A * | 11/1996 | Tran | G01S 7/38 |
| | | | | 342/13 |
| 7,576,681 | B2 * | 8/2009 | Chen | G06K 9/3241 |
| | | | | 342/175 |
| 2003/0184468 | A1 * | 10/2003 | Chen | G06K 9/3241 |
| | | | | 342/52 |
| 2004/0189521 | A1 | 9/2004 | Smoth | |
| 2004/0268111 | A1 | 12/2004 | Dayan | |
| 2007/0076917 | A1 * | 4/2007 | Chen | G06K 9/3241 |
| | | | | 382/103 |
| 2007/0244673 | A1 * | 10/2007 | Khosla | F41G 7/007 |
| | | | | 703/2 |
| 2008/0084283 | A1 * | 4/2008 | Kalik | B60Q 9/00 |
| | | | | 340/435 |
| 2009/0100995 | A1 * | 4/2009 | Fisher | F41G 7/226 |
| | | | | 89/1.11 |
| 2010/0214410 | A1 | 8/2010 | McClure | |
| 2010/0253597 | A1 * | 10/2010 | Seder | G01S 13/867 |
| | | | | 345/7 |
| 2012/0089523 | A1 | 4/2012 | Hurri | |
| 2013/0159350 | A1 | 6/2013 | Sankar | |

\* cited by examiner

ELECTRO OPTICAL AND RADIO FREQUENCY FUSION FOR THREAT DETECTION

FIELD

The disclosure relates to threat warning systems and situational awareness, and, more particularly, to systems for and methods of combining data acquired by multiple threat warning systems.

BACKGROUND

Many military platforms are equipped with multiple threat warning systems, which provide for the detection of projectiles, missiles, and other threats. These systems typically operate in the Radio Frequency (RF), and Electro-Optic (EO) portions of the Electromagnetic (EM) spectrum. In some cases, a single threat warning system of these types may receive information that is not properly interpreted as a threat. In other cases, a single threat warning system may receive information that indicates the potential presence of a threat, but that is insufficient to positively identify the threat. Such information may be disregarded as a potential false alarm, a case of mistaken identity, or other inconclusive outcome. Failure to take action in the presence of an actual threat can have dire outcomes. In still other situations, often due to incomplete information, non-threatening sources can be erroneously declared to be threats, resulting in false alarms that may distract an operator from an actual threat.

Even when multiple threat warning systems are present at the same time, each may be unable to declare the presence of a threat on its own, given the information received and known to each. Essentially, the overall suite of individual threat warning systems operates based on the principle of "No+No=No," i.e. that a threat is only declared if a single system positively declares the presence of a threat. In other scenarios, a single threat can result in multiple independent declarations from the federated systems, thereby resulting in the mistaken belief that multiple threats are present. This is particularly more likely when modern weapon systems are encountered in the battlespace. These weapons contain multiple subsystems, sometimes comprising a distributed network, each of which may or may not be detectable by the individual sensors in the threat warning suite.

What is needed, therefore, are data fusion systems and methods that allow for the various components of a threat warning suite of systems to share information in such a way as to allow threats to be more accurately identified and declared.

SUMMARY

By combining relatively low-level data from multiple threat warning systems having varying capabilities and deficiencies based on an understanding of those capabilities and deficiencies, improved threat detection is achieved. More specifically, inconclusive, insufficient, or misinterpreted data that would otherwise fail to alert relevant parties to the presence of threats is more likely to result in correct identification of threats, and the declaration of those threats to the relevant parties where data sharing and compilation techniques, as described herein, are utilized.

In this disclosure, an alert, which is also referred to as a declaration, that results from the fusion of data from multiple threat warning systems is referred to as a fused declaration. In this way, a failure of each individual threat warning system within a suite of such systems to declare a threat, does not prevent a declaration from occurring. Said another way, "No+No" scenarios, where "No's" are the failures of single threat warning systems operating within a suite of such systems, can sometimes equal an overall positive declaration by the suite—a "Yes".

Conventional multiple data processing systems involve handing-off objects to each other, and the use of multiple systems in parallel to enhance visibility or provide image overlay benefits are known. To the best of our knowledge, however, no solution exists that allows the data generated by multiple systems to be input into real-time threat detection algorithms, the output of which may be considered a fused object whose properties are derived from the data provided by the individual systems.

One embodiment of the present disclosure provides a data fusion system for combining and parsing data from multiple EO and RF threat warning systems, the system comprising: a plurality of input systems, wherein the plurality of input systems are capable of determining information about an environment in which they are operating; and a fusion block in operative communication with the plurality of input systems and battlespace information, wherein the fusion block is configured to algorithmically combine feature-level data obtained by the plurality of input systems with the battlespace information and, using the combined information, determine the presence or absence of a threat; wherein the fusion block, upon determining the presence or absence of a threat, outputs a fused output indicating the presence or absence of a threat without requiring the declaration of a threat by any input system.

Another embodiment of the present disclosure provides such a data fusion system wherein at least one of the plurality of input systems is an electro optical threat detection system and at least one of the plurality of input systems is a radio frequency threat detection system.

A further embodiment of the present disclosure provides such a data fusion system wherein at least one of the plurality of input systems is an acoustic threat detection system.

Yet another embodiment of the present disclosure provides such a data fusion system wherein the fusion block is configured to compare feature-level data received from two or more inputs and automatically suppress a subsequent declaration by the input system or allow the input system to output a declaration.

A yet further embodiment of the present disclosure provides such a data fusion system wherein the fusion block is in bidirectional communication with the plurality of inputs and outputs.

Still another embodiment of the present disclosure provides such a data fusion system wherein at least one of the outputs is a display or a speaker.

A still further embodiment of the present disclosure provides such a data fusion system wherein the fusion block incorporates apriori and dynamic battlespace information.

Even another embodiment of the present disclosure provides such a data fusion system wherein at least one of the fused outputs is configured to automatically activate electronic countermeasures.

An even further embodiment of the present disclosure provides such a data fusion system wherein at the fused output is configured to automatically trigger evasive maneuvers.

A still even further embodiment of the present disclosure provides such a data fusion system wherein at least one of the fused outputs is configured to automatically launch flares.

One embodiment of the present disclosure provides a method of fusing independent inputs, the method comprising: providing a plurality of inputs capable of providing feature-level data about an environment in which they are operating; coupling the plurality of inputs to a fusion block configured to algorithmically process the feature-level data; using the fusion block, processing the feature-level data and making a determination as to the presence or absence of one or more threats; and outputting the determination.

Another embodiment of the present disclosure provides such a method wherein the fusion block is also configured to algorithmically determine whether data received from two or more of the plurality of inputs concerns a single object of interest or multiple objects of interest before outputting the determination.

A further embodiment of the present disclosure provides such a method wherein the fusion block is configured to compare information received from two or more of the plurality of inputs and automatically determine the most accurate response before outputting the determination.

Yet another embodiment of the present disclosure provides such a method wherein the fusion block is configured to compare feature-level data received from two or more inputs and automatically suppress a subsequent declaration by the input system or allow the input system to output a declaration.

One embodiment of the present disclosure provides a vehicle, the vehicle comprising: a data fusion system for combining and parsing data, the system comprising: a plurality of threat warning systems capable of providing threat warning data about an environment in which they are operating; a fusion block in operative communication with the plurality of threat warning systems and battlespace information, wherein the fusion block is configured to algorithmically process feature-level data; and at least one output in operative communication with the fusion block whereby the fusion block may provide information and/or notifications to a human operator and/or countermeasures system.

Another embodiment of the present disclosure provides such a data fusion system wherein at least one of the plurality of input systems is an electro optical threat detection system and at least one of the plurality of input systems is a radio frequency threat detection system.

A further embodiment of the present disclosure provides such a data fusion system wherein the fusion block is configured to compare feature-level data received from two or more inputs and automatically suppress a subsequent declaration by the input system or allow the input system to output a declaration.

Yet another embodiment of the present disclosure provides such a data fusion system wherein at least one fused output is configured to automatically activate electronic countermeasures.

A yet further embodiment of the present disclosure provides such a data fusion system wherein at least one fused output is configured to automatically trigger evasive maneuvers.

Still another embodiment of the present disclosure provides such a data fusion system wherein the fusion block incorporates apriori and dynamic battlespace information.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

Figure 1:
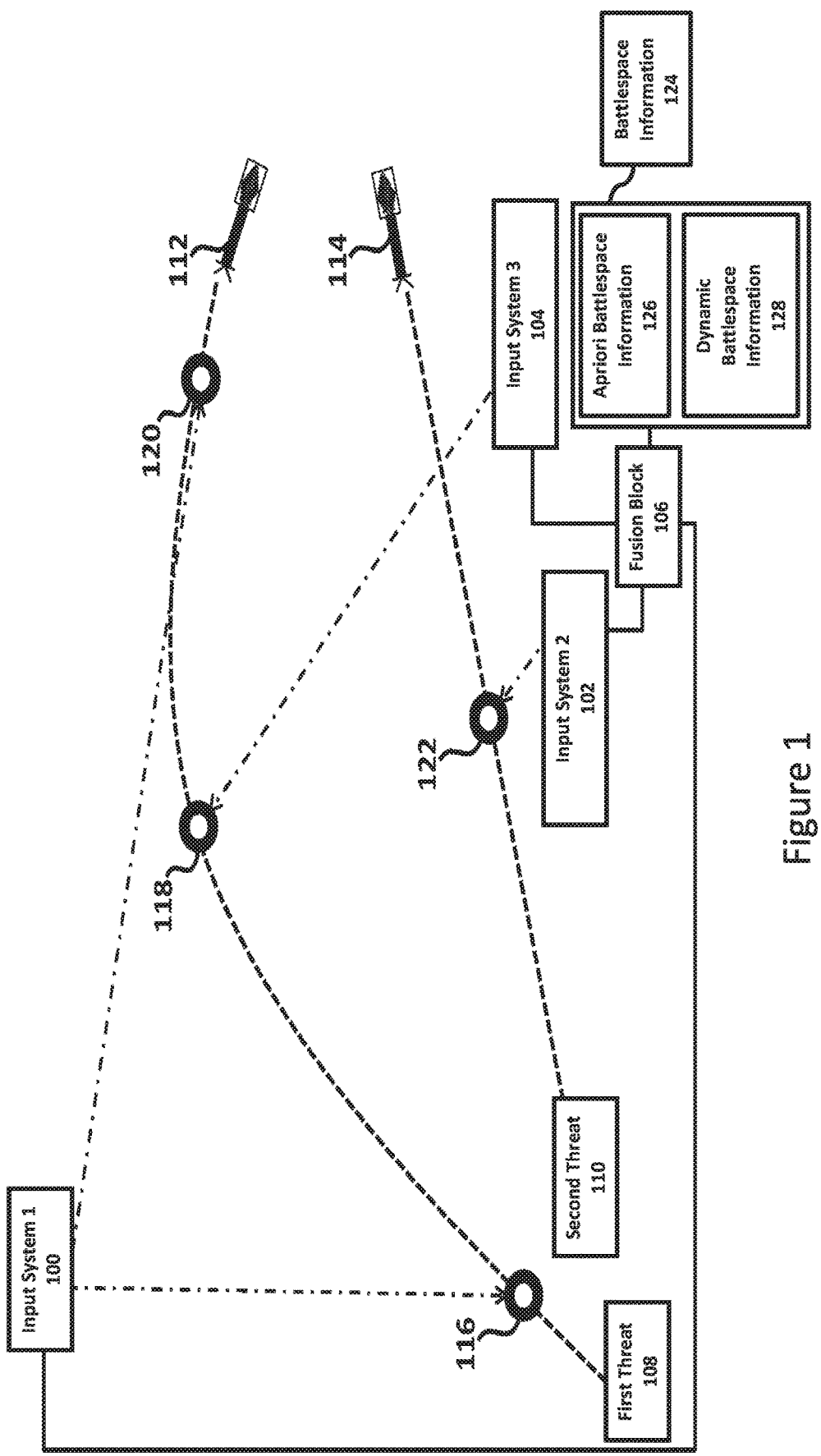
FIG. 1 is an illustration of threat warning systems linked by a fusion block observing observable components of threats, in accordance with embodiments of the present disclosure.

The present disclosure concerns systems and methods that allow for enhanced threat detection capabilities on platforms having multiple threat warning systems through data sharing and real-time processing of shared data. The information obtained from each of the threat warning systems 100/102/104/204/206/300 that is a part of a larger multi-spectral suite of threat warning systems 200, when combined with battlespace information 124 using the techniques and systems described herein, allows for superior performance. Specifically, the teachings of this disclosure allow such systems to provide better information to, and are more likely to provide alerts to, the relevant parties than any single system or combination thereof that does not make use of such data sharing and processing techniques could provide on its own.

While the disclosure is relevant to any combination of threat warning systems, it is particularly relevant to combinations of Electro Optical (EO) 204 and Radio Frequency (RF) 206 threat warning systems, which form a multi-spectral threat warning system 200. Embodiments may also combine the data from Electro Optical (EO) 204, Radio Frequency (RF) 206, and Acoustic 300 threat warning systems.

In embodiments, the multi-spectral threat warning system 200 comprises Ultraviolet/Infrared (UV/IR) EO systems 204 combined with RF systems 206. This is, in part, because combinations of such systems, by virtue of providing data from different parts of the electromagnetic (EM) spectrum, are more likely to be able to fill in gaps that may be present in each other's data. For example, certain weather conditions may disrupt EO-based systems 204 more than RF-based systems 206, while RF-based systems 206 may be more vulnerable to jamming.

Importantly, each input system of EO, RF, and acoustic input systems 204/206/300 are, in embodiments, capable of outputting multiple types of data. A first data type that may be output by each system is low-level, or raw, data, which comprises the raw, i.e. unfiltered, sensor output. A second data type that may be output by each system is feature-level data 208. Feature-level data 208, for the purposes of the present disclosure, should be understood to be data that has been smoothed and otherwise manipulated from its raw form, but that has not yet been processed by the input system to determine the presence or absence of a threat. These smoothings and manipulations refer to more than simple statistical operations on sets of data. They refer to a host of mathematical operations that tremendously simplify complex raw data based on knowledge of the underlying physics and operations behind the weapons and technology in the battlespace. This complexity can take the form of signal fluctuations over time or frequency due to the underlying physics behind emission, propagation, and detection processes. They can also vary based on situational details like range, spatial alignment, atmospherics, and enemy Concepts of Operations. Such data comes from a variety of sources such as sensors, satellites, UAVs, battlespace communications, radar, sonar, acoustics, electro-optics, and the like. As used herein, such data is collectively referred to as battlespace information 124, both apriori 126 and dynamic 128. The apriori battlespace information 126 may include measured parameters, historical information, intercepted communications, and the like as well as weapon data for particular battlespace weapons in use. Dynamic battlespace information 128 may include real time situational measurements, such as platform data including location, velocity, orientation, etc. Contrast this with Declaration level data, which is the final step of data processing taken by conventional individual input systems and involves the input system determining whether or not feature-level data 208 corresponds closely enough to built-in threat templates to justify the declaration of a threat. For example, after the low-level sensor data has been manipulated, it may be compared to information previously determined to represent the characteristics associated with various types of threats, and, if the actual data is determined to conform closely enough to the template data, a declaration would be issued, and, if not, then no declaration would be issued. Embodiments of the present disclosure combine the feature-level data 208 generated by the individual components of input systems 204/206/300 that comprise the multi-spectral threat warning system 200 with battlespace information 124, thereby allowing the fusion block 106 to use the combined pre-declaration data in conjunction with the battlespace information 124 to determine the presence or absence of a threat and to issue a declaration, in the form of a fused output 202, even where the component systems of input systems 204/206/300 would fail to do so.

For example, the fusion of data from the component systems of input systems 204/206/300 is analogous to combining a temperature sensor with a smoke alarm. While a smoke alarm might receive data that indicates the presence of smoke, that data may not exceed a predefined threshold after which a warning would be issued. Similarly, a temperature sensor may detect a rise in temperature that is below a predefined threshold after which a temperature warning would be issued. By combining the pre-declaration data generated by each system, a threat could be confidently declared given the simultaneous rise in temperature and smoke. This example reveals the concept, but is deliberately simplistic for clarity. The tell-tale features of real threats are dynamic in the battlespace and evolve over time; they are not necessarily even physical properties of the objects in question. They can be abstract combinations of properties having to do with flight ballistics, radiated waveforms, chemical emissions, and/or intercepted communications. According to one embodiment, it is the understanding of these threats, and the manner in which they are employed that allows useful detection criteria to be processed.

Another example would be where an infrared sensor onboard an airplane detects a relatively low heat signature that is below the threshold for triggering a declaration while another EO or an RF based sensor measures a relatively fast-moving projectile that similarly fails to trigger predefined criteria for declaring a threat. By combining the feature-level data 208 from each input system, a clearer picture of the threat emerges, i.e. there is something relatively hot (e.g. an engine) moving at a relatively high speed (potentially a projectile). This additional data allows for sensors with orthogonal features to be combined, allowing a more complete threat picture to be generated, as compared to each system determining the presence of a threat and whether or not to declare the presence of a threat on its own. By going one step further and combining this information with battlespace information 124, such as apriori battlespace information 126, the speed and heat signature of the suspected projectile may very well allow the particular type of projectile to be identified or limited to a small number of possibilities. This more detailed picture of the threat could then be used in conjunction with dynamic battlespace information 128 to determine the most appropriate response.

Now referring to FIG. 1, an illustration of a suite of threat warning systems (100, 102, and 104), wherein at least one threat warning system is EO based and at least one threat warning system is RF based, witnessing observable components from multiple threats (108 and 110) is shown. Specifically, a data fusion algorithm including or connected to sources of battlespace information 124, including apriori battlespace information 126 and dynamic battlespace information 128, hereafter referred to as the fusion block 106, having three input systems, input system 1 100, input system 2 102, and input system 3 104, wherein each input system is a threat warning system (collectively they may be referred to as a multi-spectral threat warning system 200 or as a suite of threat warning systems 200), is shown. FIG. 1 further shows a first threat 108 and a second threat 110.

Each threat 108/110 shown in FIG. 1 is depicted as having launched a projectile 112/114 whose path of travel is shown using dotted lines, with the first threat 108 having launched a first projectile 112 and the second threat 110 having launched a second projectile 114. The individual threat warning systems that comprise the suite 200, track the two projectiles 112/114 throughout the engagement. Input system 1 100 measures the first projectile 112 at point 1 116 and point 3 120. Input system 2 102 measures the second projectile 114 at point 4 122. Finally, input system 3 104 measures the first projectile 112 at point 2 118. In embodiments, the three input systems 100/102/104 include both EO and RF threat detection systems. In embodiments, the input systems 100/102/104 are any single or multiple combination of EO 204, RF 206, and acoustic 300 threat detection systems.

In embodiments, the fusion block 106, using its knowledge of battlespace information 124, dynamically integrates these four measurements 116/118/120/122, which, in embodiments, are feature-level measurements, from the three distinct input systems 100/102/104 using data fusion techniques to understand the two projectiles 112/114 and, in embodiments, the weapons from which they were fired. As mentioned previously, for modern threats, these measurements are more complex than simple images or signals from ballistic objects. The engagements in question can span and evolve over many minutes and may involve assets that are spatially separated by many kilometers. Detailed understanding of these capabilities, enemy behavior, and their measurable observables, i.e. apriori battlespace information 126, allows the creation of a coherent picture that allows the threats to be discerned in a 'noisy' battlespace filled with many natural and man-made signals. This ensures that an alert is sounded even if the input systems 100/102/104, singularly, lack sufficient information to declare a threat. It further ensures that the proper number of threats are indicated—no more and no less—and that their respective projectiles are properly accounted for. The fused data may be referred to as the fused output 202. Using the information, the fusion block 106 can then provide the relevant information (i.e. the fused output 202) to the relevant person(s), in embodiments without duplication, and with better accuracy as compared to separate notification by components of the multi-spectral threat warning system 200. In embodiments, this fused output 202 may also be used to immediately take action to mitigate the threat, including automatic initiation of Electronic Counter Measures (ECM), launching of flares, and taking of evasive actions. Such embodiments allow for even faster reactions to threats than would be possible if an operator were informed of the threat(s) and required to determine appropriate actions and then implement those actions on his or her own.

In one embodiment, warnings are issued only through the fusion block 106, while, in other embodiments, each component of the multi-spectral threat warning system 200 may still individually declare a threat, with the fusion block declaring a threat where data known to each component of the multi-spectral threat warning system 200 is insufficient to cause those components to declare the threat on their own. In one example, the threat declaration would result in some action, such as counter-measures. In another example, the threat declaration would be an alert that can be sent to one or more parties for evaluation or action. In yet another example, the threat declaration is displayed to a user of the system.

For example, in embodiments, if an EO input system 204 detects "X", this alone may be considered inconclusive. If an RF input system 206 detects "Y", this may also be considered inconclusive. If, however, the EO input system 204 detect(s) "X" AND the RF input system 206 detects "Y" (subject to timing, geometry assessments, and other assessments), this is likely to be considered conclusive, and result in a fused output 202 declaring a threat.

Figure 2:
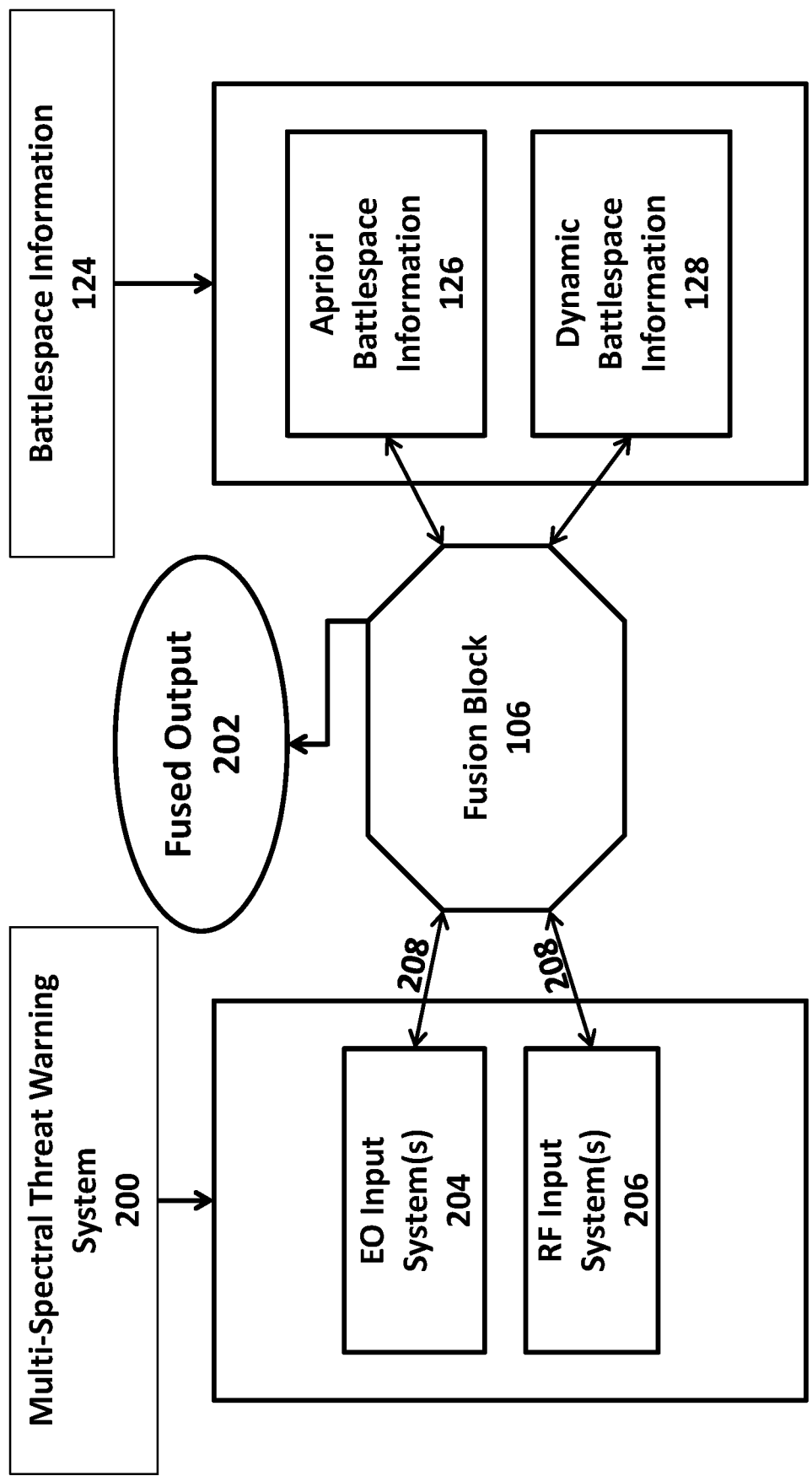
FIG. 2 is a diagram of fusion block system architecture, in accordance with embodiments of the present disclosure.

FIG. 2 describes, using a schematic perspective, the architecture of the data fusion block 106, and associated systems and components, in accordance with embodiments of the present disclosure. In this system, the fusion block 106 combines and analyzes feature-level data 208 obtained by input systems 100/102/104, which are individual components of a multi-spectral threat warning system 200 present on a single platform that includes both EO input system(s) 204 and RF input system(s) 206, using data fusion techniques and battlespace information 124, including apriori battlespace information 126 and dynamic battlespace information 128. Specifically, each input system 100/102/104 provides separate data to the fusion block 106. The fusion block 106 then analyzes the data in real-time using algorithms and other data fusion techniques, and determines the appropriate notification(s) (e.g. declaration(s)) to provide as a fused output 202.

The rules and logic within the fusion block 106 are based on an understanding of the behavior of the various threat systems (i.e. apriori battlespace information 126), and the platform on which they are present (i.e. dynamic battlespace information 128). The detailed understanding of sequences of subtle measurements can provide distinct 'fingerprints' that allow for positive confirmation of a threat. In some embodiments, data, which may be feature-level data 208, from other platforms may also be utilized. Examples include simultaneous measurements from wingmen or standoff assets (i.e. dynamic battlespace information 128), as well as apriori measurements from reconnaissance assets (i.e. apriori battlespace information 126) that are then overlaid upon current measurement sets. The rules allow the fusion block 106 to determine how best to combine the data generated by the multiple inputs 200 into a fused output 202. Note that in some cases, this can mean to suppress them (e.g. when data generated by one input system results in the realization that data generated by another input system is not indicative of a threat). These rules may, in embodiments, also accommodate "unknown" or "uncertain" parameters from the input systems 100/102/104. They might also result in more accurate assessments of threat position or type, than is possible to achieve through the individual measurements of RF input system(s) 206 and/or EO input system(s) 204 taken alone. This is analogous to the manner in which simply hearing thunder or seeing lightning does not give the observer enough information to estimate distance. Using these two pieces of information together, however, allows the observer to calculate something new; specifically the distance to the event.

In embodiments, communication between the fusion block 106 and the multi-spectral threat warning system 200 comprising both EO input system(s) 204 and RF input system(s) 206 can be bidirectional, enabling the fusion block 106 to request additional information from the inputs where necessary or desired. Furthermore, the fusion block 106, in embodiments, may also provide feedback, such as synchronization data, to the input threat warning systems 200.

Although the disclosure discusses the multiple threat warning systems 200 of embodiments comprising three input systems 100/102/104, any number of input systems may be utilized in various embodiments.

Figure 3:
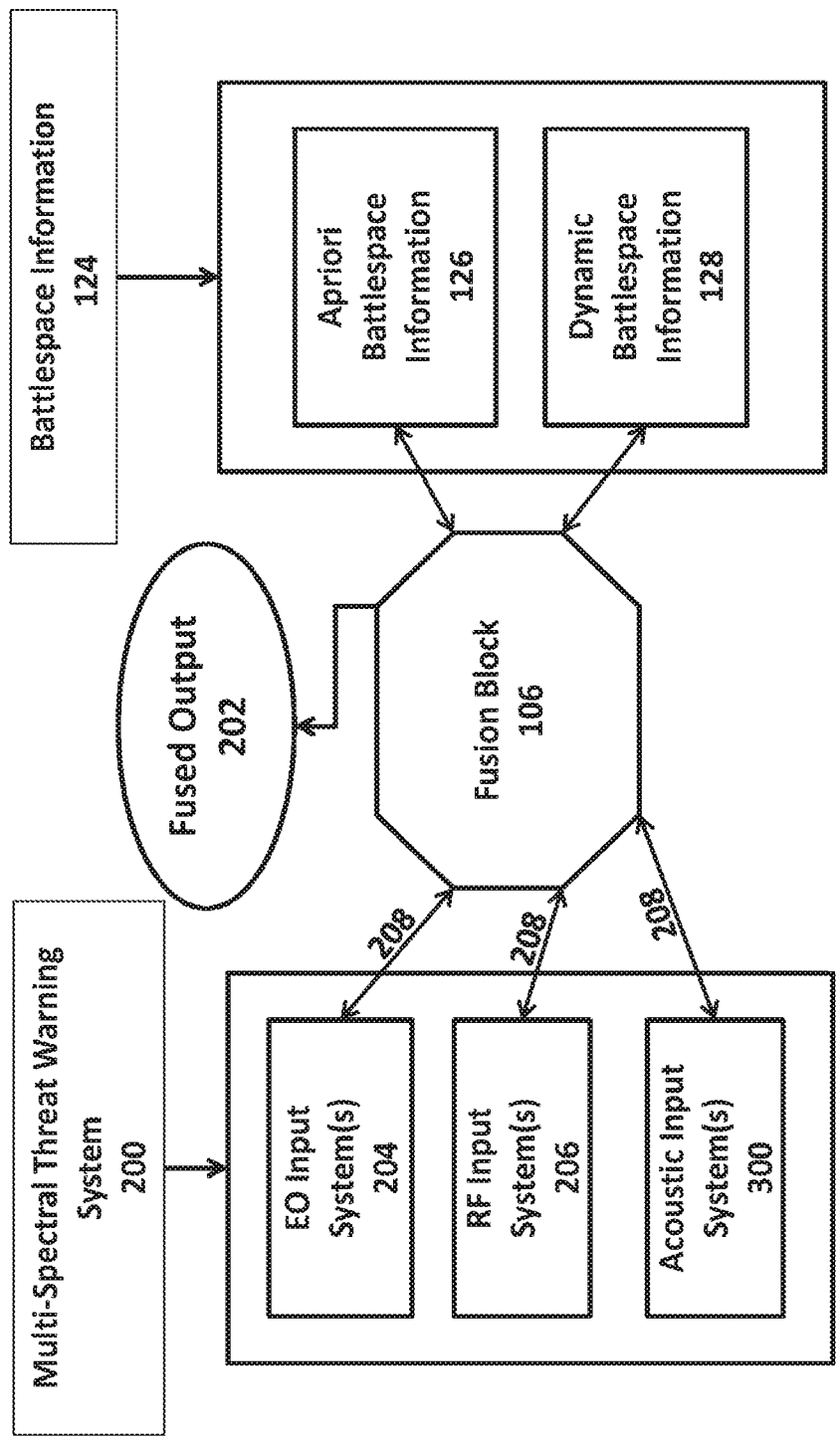
FIG. 3 is a diagram of fusion block system architecture, in accordance with embodiments of the present disclosure.

Referring to FIG. 3, a variation on the embodiment shown in FIG. 2 that includes acoustic input system(s) 300 as part of the multi-spectral threat warning system 200 is show.

Figure 4:
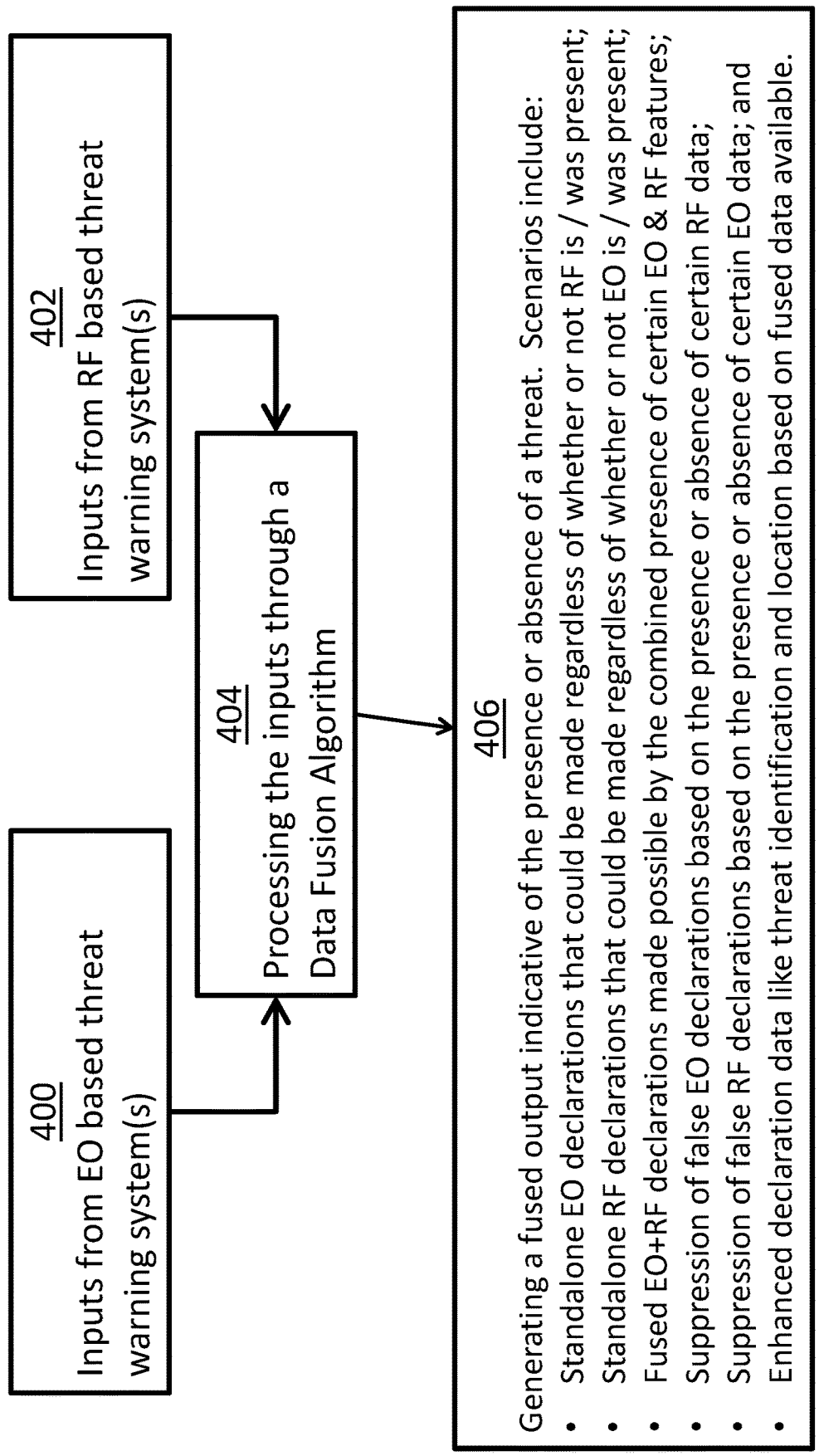
FIG. 4 is a process flow of a method in accordance with embodiments of the present disclosure.

Referring to FIG. 4, one embodiment of the process is illustrated. FIG. 3 illustrates how inputs from EO based threat warning systems) 400 and inputs from RF based threat warning system(s) 402 are processed through a data fusion algorithm 404, allowing a fused output indicative of the presence or absence of a threat to be generated 406.

Although the present disclosure is most germane to Common Missile Warning System (CMWS) and Joint and Allied Threat Awareness System (JATAS) threat warning scenarios, it is a more general concept that is generally applicable to multi-spectral detection applications as well, as would be apparent to one of ordinary skill in the art in light of the present disclosure.

The teachings of this disclosure are also relevant, at least, to any UV/IR system focused on hostile fire or missile warning detection that has access to RF and/or acoustic detection information for the same threat types. The disclosure is further relevant to airborne, ground, and fixed installation platforms. It can also be more broadly applied to a system with UV/IR, RF and/or acoustic inputs that can use the same methodology in combining these spectra for an overall threat determination.

Furthermore, while the present disclosure focuses on the above-described problems in the context of multi-spectral threat warning systems 200, it could equally apply to any system using multiple EO input system(s) 204, RF input system(s) 206, and other types of input systems, such as acoustic input systems 300, especially those that are relatively complex. There are several applications where it would be beneficial to sort through data from multiple, uncoordinated input systems in order to create an integrated picture of 'reality'. Examples include: an aircraft landing aide that blends radar, altimeter, and optical inputs and a collision avoidance system that uses radar, optics, and acoustic sensors.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A data fusion system for combining and parsing data, the system comprising:
   a plurality of threat warning systems, wherein said plurality of threat warning systems are configured to determine information about an environment in which they are operating; and
   a memory storage comprising battlespace information including at least one of apriori battlespace information and dynamic battlespace information;
   a fusion block in operative communication with said plurality of threat warning systems and said memory storage comprising battlespace information,
   wherein said fusion block is configured to algorithmically combine feature-level data obtained by said plurality of threat warning systems with the battlespace information and, using said combined information, determine the presence or absence of a threat, and
   wherein said fusion block, upon determining the presence or absence of a threat, outputs a fused output indicating the presence or absence of a threat without requiring the declaration of a threat by any of said threat warning systems.

2. The data fusion system of claim 1 wherein at least one of the plurality of threat warning systems is an electro optical threat detection system and at least one of the plurality of threat warning systems is a radio frequency threat detection system.

3. The data fusion system of claim 2 wherein at least one of the plurality of threat warning systems is an acoustic threat detection system.

4. The data fusion system of claim 1 wherein said fusion block is configured to compare feature-level data received from two or more inputs, and automatically suppress a subsequent declaration by any of said threat warning systems or allow any of said threat warning systems to output a declaration.

5. The data fusion system of claim 1 wherein said fusion block is in bidirectional communication with the plurality of threat warning systems and the memory storage.

6. The data fusion system of claim 1 wherein said fused output is to a display or a speaker.

7. The data fusion system of claim 1, wherein the fusion block incorporates both apriori and dynamic battlespace information.

8. The data fusion system of claim 1 wherein said fused output is configured to automatically activate electronic countermeasures.

9. The data fusion system of claim 1 wherein said fused output is configured to automatically trigger evasive maneuvers.

10. The data fusion system of claim 1 wherein said fused output is configured to automatically launch flares.

11. A method of fusing independent inputs, the method comprising:
    providing a plurality of threat inputs from threat warning systems capable of providing feature-level data about an environment in which they are operating;
    retrieving battlespace information from memory storage wherein the battlespace information comprises at least one of apriori battlespace information and dynamic battlespace information;
    coupling the plurality of threat inputs from threat warning systems and the battlespace information from memory storage to a fusion block configured to algorithmically process said feature-level data and the battlespace information;
    using the fusion block, processing said feature-level data with the battlespace information and making a determination as to the presence or absence of one or more threats; and
    outputting said determination.

12. The method of claim 11 wherein said fusion block is also configured to algorithmically determine whether data received from two or more of the plurality of threat inputs from the threat warning systems concerns a single object of interest or multiple objects of interest before outputting said determination.

13. The method of claim 11 wherein said fusion block is configured to compare information received from two or more of the plurality of threat inputs from the threat warning systems and automatically determine the most accurate response before outputting said determination.

14. The method of claim 11 wherein said fusion block is configured to compare feature-level data received from two or more threat inputs from the threat warning systems and automatically suppress a subsequent declaration by the fusion block or allow the fusion block to output a declaration.

15. A vehicle, the vehicle comprising:
    a data fusion system for combining and parsing data;
    a plurality of threat warning systems capable of providing threat warning data about an environment in which they are operating;
    a memory storage comprising battlespace information including at least one of apriori battlespace information and dynamic battlespace information;
    a fusion block in operative communication with said plurality of threat warning systems and battlespace information, wherein said fusion block is configured to algorithmically process feature-level data from the threat warning data; and
    at least one fused output in operative communication with said fusion block whereby said fusion block provides information and/or notifications to a human operator and/or countermeasures system indicative of the presence or absence of a threat.

16. The data fusion system of claim 15 wherein at least one of the plurality of threat warning systems is an electro optical threat detection system and at least one of the plurality of threat warning systems is a radio frequency threat detection system.

17. The data fusion system of claim 15 wherein said fusion block is configured to compare feature-level data received from two or more threat warning systems and automatically suppress a subsequent declaration by the fusion block or allow the fusion block to output a declaration.

18. The data fusion system of claim 15 wherein the at least one said fused output is configured to automatically activate electronic countermeasures.

19. The data fusion system of claim 15 wherein the at least one said fused output is configured to automatically trigger evasive maneuvers.

20. The data fusion system of claim 15 wherein the fusion block incorporates both apriori and dynamic battlespace information.

\* \* \* \* \*